UNITED STATES PATENT OFFICE.

CHARLES H. BAXTER AND HENRY HORROCKS, OF FALL RIVER, MASS.

IMPROVEMENT IN SOAP COMPOSITION.

Specification forming part of Letters Patent No. 189,175, dated April 3, 1877; application filed February 17, 1877.

*To all whom it may concern:*

Be it known that we, CHARLES HENRY BAXTER and HENRY HORROCKS, of Fall River, in the county of Bristol and State of Massachusetts, have invented a new and valuable Improvement in Sizing-Soap; and we do hereby declare that the following is a full, clear, and exact description of the construction and operation of the same.

This invention consists in a composition of matter to be used as a sizing-soap for fabrics, composed of the following ingredients, in the proportions hereinafter named.

In preparing said composition, first mix together the materials in the quantities stated below: One hundred (100) pounds of sal-soda; seventy (70) pounds of best white soap; fifty (50) pounds of rosin; ten (10) pounds of baryta; ten (10) gallons of lard-oil; ninety-five (95) gallons of water; twenty-five (25) gallons of silicate of soda. Then boil the above mixture for one hour. This will produce one hundred gallons of our sizing-soap.

This is mixed with the starch used by "slashers" in cotton-mills, and operates to keep the material white and in good working order. It enables the manufacturers to dispense with tallow and other substances now used for the same purpose. It is very cheap and efficacious. The proportions of the ingredients may be somewhat varied without departing from our invention.

What we claim as new, and desire to secure by Letters Patent, is—

A sizing-soap composed of sal-soda, white soap, rosin, baryta, lard-oil, water, and silicate of soda, in the proportions substantially as set forth.

In testimony that we claim the above we have hereunto subscribed our names in the presence of two witnesses.

CHARLES HENRY BAXTER.
  HENRY HORROCKS.

Witnesses:
 GEORGE LAD,
 JAMES INGHAM.